United States Patent [19]
Uchida

[11] Patent Number: 5,873,336
[45] Date of Patent: Feb. 23, 1999

[54] CAM DRIVE SYSTEM FOR ENGINE

[75] Inventor: Masahiro Uchida, Iwata, Japan

[73] Assignee: Yamaha Hatsudoki Kabushiki Kaisha, Iwata, Japan

[21] Appl. No.: 927,881

[22] Filed: Sep. 11, 1997

[30] Foreign Application Priority Data

Sep. 11, 1996 [JP] Japan ..................... 8-240504

[51] Int. Cl.$^6$ ................. F02F 1/24; F01L 1/02
[52] U.S. Cl. ..................... 123/90.31; 123/90.38; 123/193.5
[58] Field of Search ............ 123/90.27, 90.31, 123/90.38, 195 C, 198 E, 193.5

[56] References Cited

U.S. PATENT DOCUMENTS

| | | | |
|---|---|---|---|
| 4,607,601 | 8/1986 | Kohler | 123/90.31 |
| 4,750,455 | 6/1988 | Ebesu | 123/90.31 |
| 4,915,070 | 4/1990 | Okui | 123/196 R |
| 4,944,263 | 7/1990 | Nagano et al. | 123/90.27 |
| 4,951,623 | 8/1990 | Jingu et al. | 123/90.27 |
| 4,993,374 | 2/1991 | Okui | 123/90.31 |
| 5,024,287 | 6/1991 | Okui et al. | 180/297 |
| 5,050,701 | 9/1991 | Okui et al. | 180/297 |
| 5,113,807 | 5/1992 | Kobayashi | 123/90.31 |
| 5,154,144 | 10/1992 | Okui et al. | 123/90.31 |
| 5,184,582 | 2/1993 | Okui et al. | 123/90.31 |

*Primary Examiner*—Weilun Lo
*Attorney, Agent, or Firm*—Knobbe, Martens, Olson & Bear LLP

[57] ABSTRACT

This invention is adapted to improve a cam drive system for an overhead camshaft internal combustion engine having a cylinder block defining at least one cylinder bore. A cylinder head assembly is affixed to the cylinder block and closes one end of the cylinder bore to form a combustion chamber therein. The cylinder head assembly comprises a main valve associate with the combustion chamber. The crankshaft is rotatably journalled relative to the cylinder block at the end of the cylinder bore opposite the cylinder head and driven by the piston. The cylinder head assembly includes at least one detachable member to provide at least in part a journal for journalling an intermediate cam drive shaft for rotation about an axis parallel to the axes of rotation of the crankshaft and the camshaft.

11 Claims, 8 Drawing Sheets

CAM DRIVE SYSTEM FOR ENGINE

BACKGROUND OF THE INVENTION

The invention relates to an improved engine unit for a motor vehicle and more particularly to an improved cam drive system for such an engine.

As is well known, the spatial requirements of motors for vehicles are critical. This is due to the increased complexity of the engines, transmissions and the number of accessories driven by the engine. Also, the configuration of modern motor vehicles and their streamlining dictates relatively small and sometimes undesirable configurations for the engine compartment in order to achieve the overall design effects of the vehicle.

In order to achieve low hood lines and better streamlining, resort has been made to positioning the engine transversely in the engine compartment in a front engine, front wheel drive vehicle. Of course, such transverse engine locations in rear engine, rear wheel drive vehicles are also widely used. Nevertheless, even though such an orientation can improve the layout of the engine compartment, there is still a problem in connection with the length of the engine. Specifically, it is extremely important that the length of the engine, the portion extending transversely across the engine compartment, is short.

As is well known, the power output of an engine and its efficiency can be increased if one or more overhead mounted camshafts are employed for operating the valve train. Conventionally, such camshafts are driven off one end of the crankshaft. This design has been replaced by driving the camshafts through an intermediate cam drive shaft completely journalled in the cylinder head. However, by journalling the intermediate cam drive shaft in the cylinder head manufacturing and assembly difficulties arise. For instance, because of the proximity of the journal housing to the air intake region it is very difficult to locate the manufacturing means correctly with respect to the cylinder head. Further, because the journal housing is integral with the cylinder head the accessibility for maintenance or service is diminished.

It is, therefore, a principal object of this invention to provide an improved camshaft drive arrangement for an internal combustion engine.

SUMMARY OF THE INVENTION

This invention is adapted to be embodied in an overhead camshaft internal combustion engine having a cylinder block defining at least one cylinder bore. A cylinder head assembly is affixed to the cylinder block and closes one end of the cylinder bore to form a combustion chamber therein. A piston reciprocates in the cylinder block. The cylinder head assembly comprises a main valve associate with the combustion chamber. The crankshaft is rotatably journalled relative to the cylinder block at the end of the cylinder bore opposite the cylinder head and driven by the piston. The cylinder head assembly includes at least one detachable member to provide at least in part a journal for journalling an intermediate shaft for rotation about an axis parallel to the axes of rotation of the crankshaft and the camshaft. A first flexible transmitter for driving said intermediate shaft from said crankshaft and a second flexible transmitter for driving said camshaft from said intermediate shaft connect the various shafts of the present invention.

DETAILED DESCRIPTION OF THE PREFERRED EMBODIMENTS OF THE INVENTION

Figure 1:
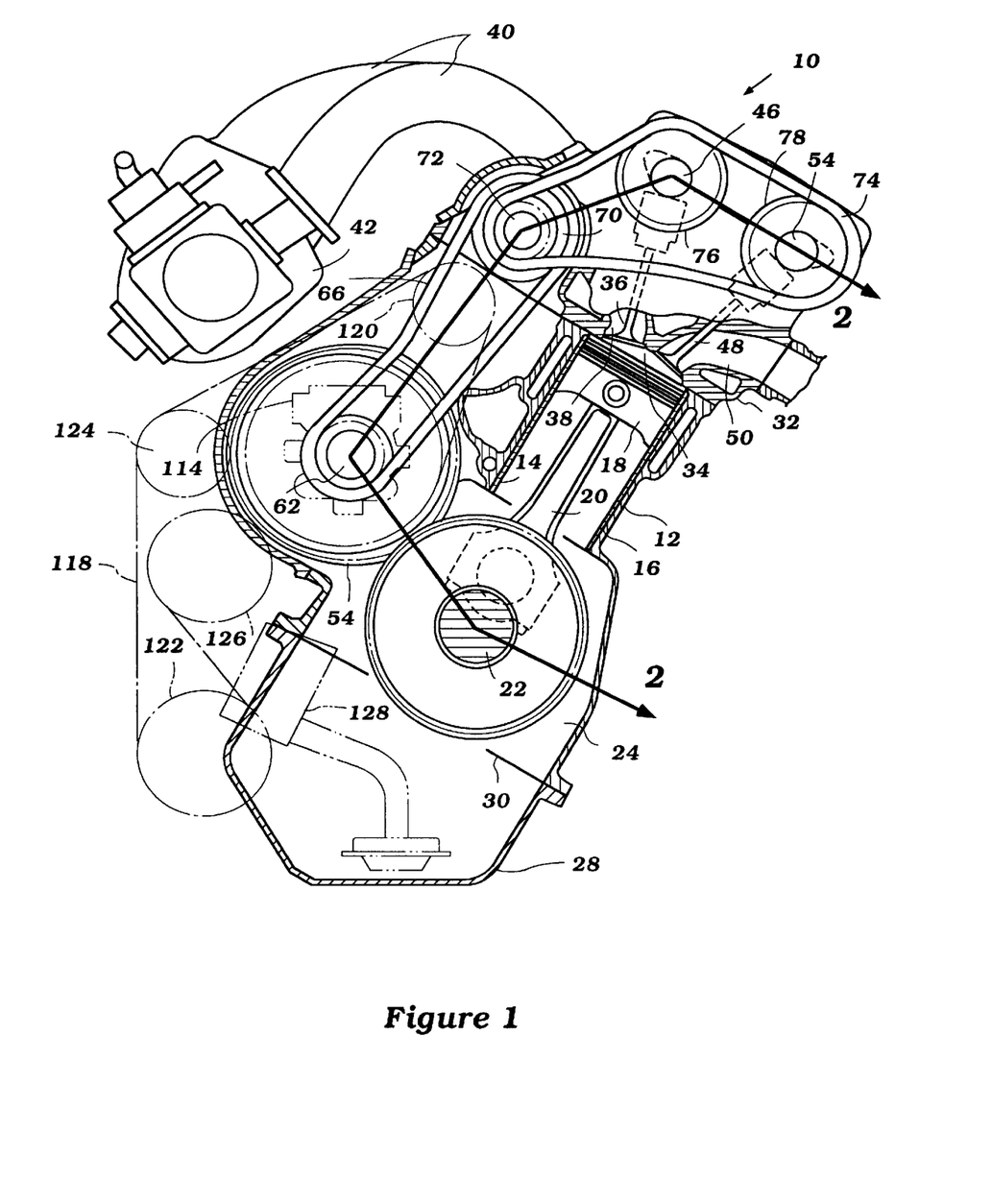
FIG. 1 is a side elevational view of an engine, with portions broken away and other portions shown in section.

Referring first to FIG. 1 an engine, is constructed in accordance with an embodiment of the invention is identified generally by the reference numeral 10. The engine 10 is depicted as being of the in-line, five cylinder, four cycle type. It is to be understood, however, that the invention may be utilized in conjunction with engines having other cylinder numbers or other cylinder configurations. Also, certain facets of the invention may be employed in conjunction with engines other than those of the reciprocating type. Nevertheless, the invention has particular utility in in-line type of engines.

The engine 10 is comprised of a cylinder block 12 which may be formed of a light weight material such as cast aluminum alloy and which has cylinder liners 14 that define cylinder bores 16 in which pistons 18 reciprocate. The cylinder bore axes define a plane that is inclined rewardly from the vertical. The pistons 18 are connected by means of connecting rods 20 to a crankshaft 22 that is journalled in a dry sump crankcase 24 of the engine 10 in a known manner, as by means of spaced main bearings 26. The crankcase 24 is defined by the lower end of the cylinder block 12 and a lower oil pan 28 that is joined to the cylinder block 12 in a suitable manner along an upwardly and forwardly inclined parting line 30.

A cylinder head 32 is affixed to the cylinder block 12 in a known manner and has individual recesses 34 that cooperate with the cylinder bores 16 and pistons 18 to define the engine combustion chambers. At least one intake valve 36 is slidably supported in the cylinder head 32 and cooperates with an intake passage 38 formed in the cylinder head 32 for delivering a fuel air charge to the combustion chamber 34. It should be noted that the intake manifold 40 has a generally arcuate configuration with individual runners for each of the combustion chambers 34 and or intake valves 36.

The manifold 40 curves arcuately forwardly and terminates in a throttle body 42 in which individual throttle valves, not shown, are positioned for controlling the flow through the manifold passages 38. An inlet connection, not shown, to the throttle body 42 extends into a transversely extending plenum chamber, also not shown, that is positioned forwardly of the engine 10. An air filter inlet and filter element, both not shown, are positioned at one end of the plenum chamber for delivery of filtered fresh air to the plenum chamber.

Fuel injectors, not shown, are supported in the cylinder head 32 and discharge fuel supplied from a fuel rail into the cylinder head intake passages 38 in proximity to the intake valves 36. The fuel injection system is controlled by any suitable arrangement.

An intake camshaft 46 is supported in the cylinder head 32 in an appropriate manner and operates the intake valve 36. The intake camshaft 46 is driven in a manner to be described.

At least one exhaust valve 48 is supported in the cylinder head 32 in a known manner so as to control the flow of exhaust gases from the combustion chambers 34 into cylinder head exhaust passages 50. The exhaust passages 50 cooperate with an exhaust manifold 52 and an exhaust system, not shown, for discharging the exhaust gases from the engine 10 to the atmosphere and for silencing the discharged exhaust gases. The exhaust valves 48 are operated by means of an exhaust camshaft 54 that is journalled within the cylinder head 32 and driven in a manner to be described.

With conventional engines, it is the practice to drive the camshafts 46 and 54 from a camshaft drive arrangement located at one end of the crankshaft 22. The disadvantage with such an arrangement is that it adds to the overall length of the engine. This is not particularly desirable in connection with transverse engine placement of the type herein described. Therefore, in order to reduce the overall length of the engine 10 while still maintaining a generally simple construction, one of cheeks of one of the throws of the crankshaft 22 is generally continuous and cylindrical and is provided with an external gear 56. This gear 56 is preferably formed on one of the throws inwardly from one end of the crankshaft 22. In accordance with the illustrated embodiment, one cheek of the throw associated with the number two cylinder is formed with the gear 56. A torsional vibration damper 58 is fixed to the opposite end of the crankshaft 22.

Figure 3:
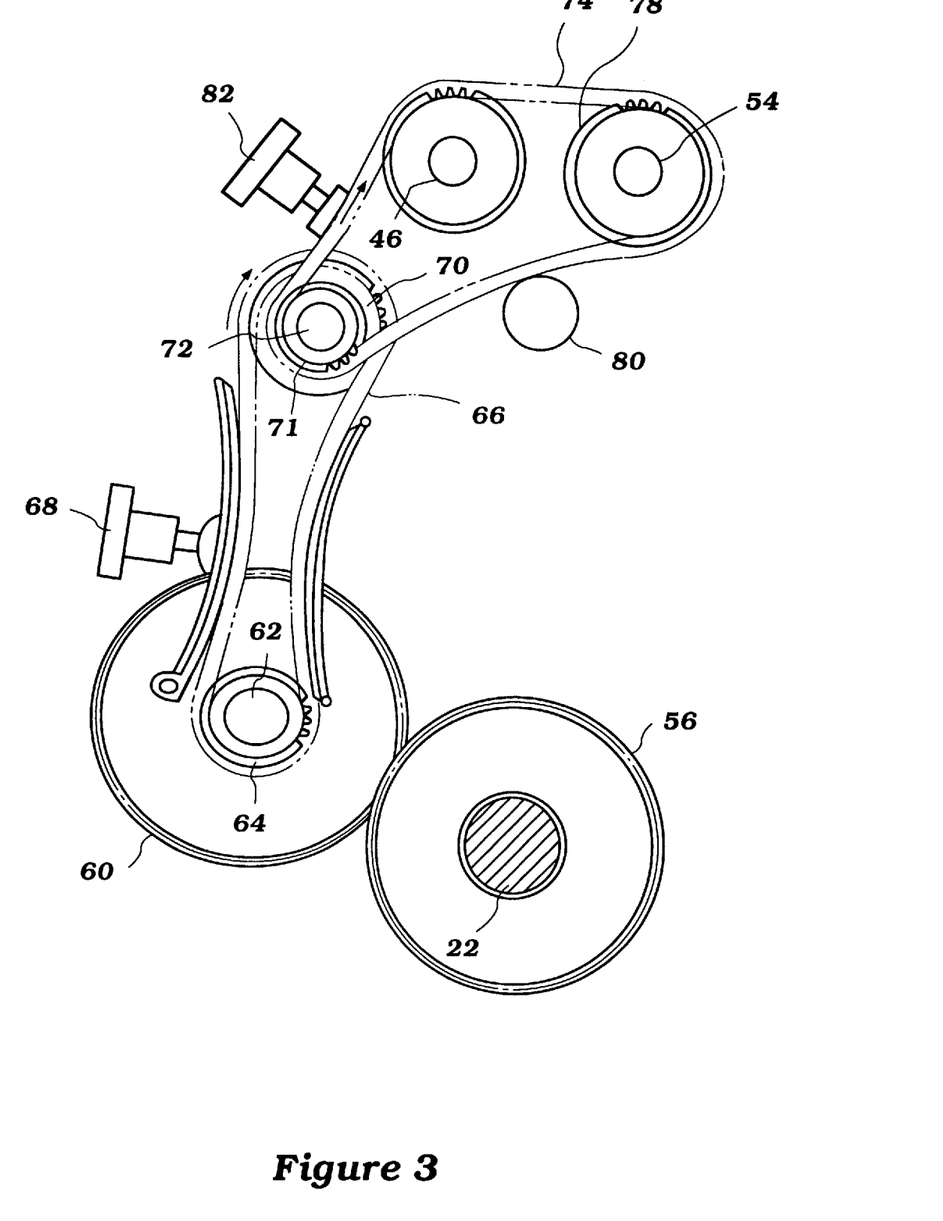
FIG. 3 is a cross-sectional view showing the camshaft drive arrangement on an enlarged scale and taken in the direction of the line 3—3 of FIG. 2.

The gear 56 meshes with a further gear 60 that is supported for rotation about an axis that is parallel to the axis of rotation of the crankshaft 22 but which is offset forwardly and slightly upwardly of the same crankshaft 22. This relationship is best seen in FIG. 1 although it also appears in FIG. 3. The gear 56 is formed integrally with a balance shaft 62 on which is formed a driving sprocket 64. An appropriate tensioner 68 provides tension in the chain 66. Although chains are used in the preferred embodiment it is understood that any flexible member could be an adequate substitute for the chain. The chain 66 transfers driving forces from the sprocket 64 to sprocket 70 on the intermediate cam drive shaft 72 journalled as described below. A further chain 74 is driven by sprocket 71 on the intermediate cam drive shaft 72 and drives sprockets 76 and 78 on the camshaft 46 and 54 respectively. The chain 74 also contacts sprocket 80 to guide the chain 74. An appropriate tensioner 82 provides tension to the chain 74.

Figure 10:
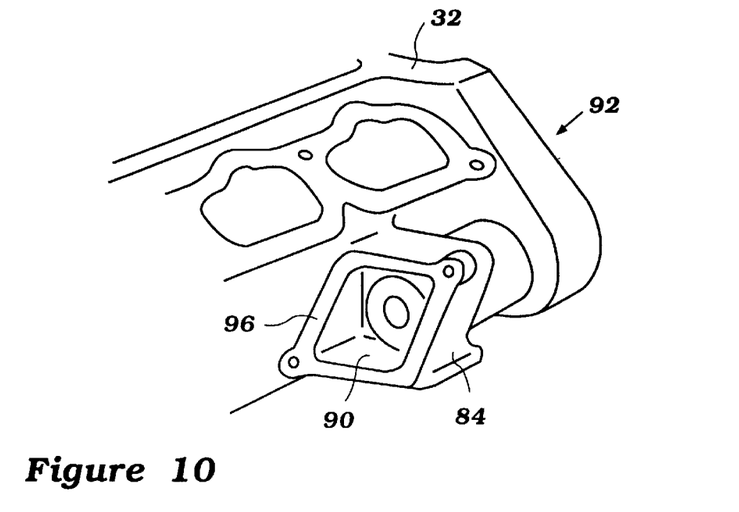
FIG. 10 is partial perspective view of a cylinder head of the prior art.
Figure 11:
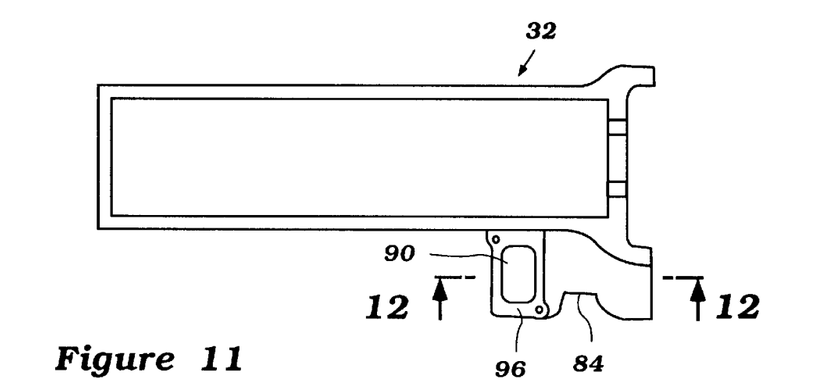
FIG. 11 is a top view of the cylinder head of the cylinder head of FIG. 10.
Figure 12:
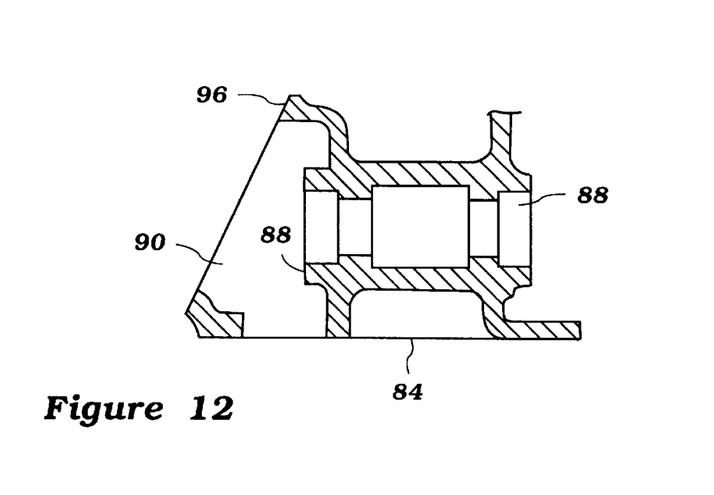
FIG. 12 is a partial cross sectional view of the cylinder head of FIG. 10 taken generally along line 12—12.

The prior art illustrates the housing 84 for the intermediate cam drive shaft 72 as being integral with the cylinder head 32 as shown in FIGS. 10, 11 and 12. There are several problems associated with incorporating this design in mass production. First, dealing with the manufacturing problems in developing a journal or bearing housing, generally referred to as 86, on the cylinder head 32. In order to manufacture a bearing surface on the cylinder head, the cylinder head must be machined to precise dimensions. The bearing surfaces are defined as 88 and are typically machined by drilling means as known in the art.

There is also an inherent disadvantage of performing machining on a large part such as a cylinder head 32. For instance, in order to machine any part either the machine must move with respect to the part or the part must move with respect to the machine. In the case as presently defined, either the cylinder head must be moved with respect to the drilling means or the drilling means must be moved with respect to the cylinder head. As shown best in FIG. 12 the surfaces 88 are not through holes and therefore each require a separate pass of the drilling means thereby adding additional processes in the manufacturing of the cylinder head 32. If the drilling means was held stationary the process would require the cumbersome positioning of the cylinder head 32. In the alternative, if the cylinder head was held stationary it would be difficult to position the drilling means correctly due to the proximity of the housing 84 to the cylinder head intake portions 38 of the cylinder head 32.

In addition to the manufacturing problems associated with the prior art there are several assembly and serviceability disadvantages of the design as shown in FIGS. 10, 11, and 12. For instance, in order to assemble the camshaft drive in the above mentioned figures the intermediate cam drive shaft 72 is inserted into the insertion window 90. Next the drive chain 66 is then mounted on the sprocket 70. While the insertion window of the prior art is designed to allow accessibility, the design requires an additional cover plate, not shown, to close out the insertion window 90.

Another assembly problem is caused by the design of the cam shaft drive cover 92 as seen in FIGS. 10 and 11. The assembly and serviceability is hindered due to the lack of accessible area around the cam sprockets 76, 78 and 80. This lack of area increases the level of difficulty in positioning the chain 74 with respect to the sprockets 76, 78 and 80 both in the initial assembly as well as during maintenance of the cam shaft drive. The increased difficulty will increase the amount of time required to assemble, as well as repair, the cam shaft drive.

Figure 4:
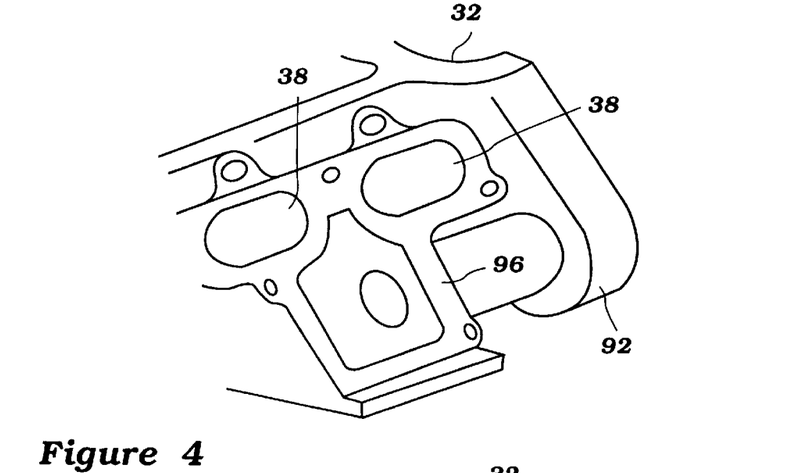
FIG. 4 is a partial perspective view of the cylinder head of the engine of FIG. 1.
Figure 5:
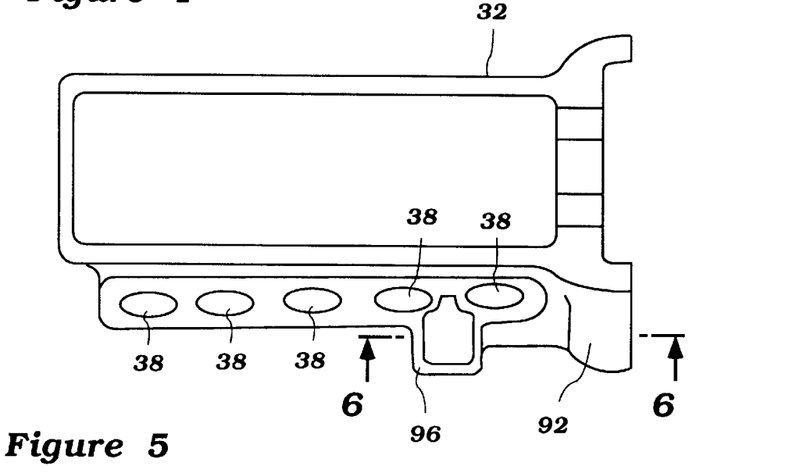
FIG. 5 is a top view of the cylinder head of FIG. 4.
Figure 6:
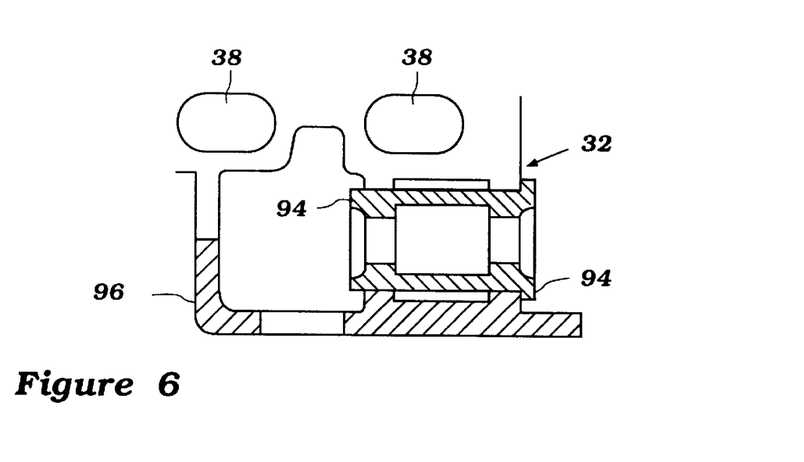
FIG. 6 is a cross-sectional view of the cylinder head taken generally along the line 6—6 of FIG. 5.

In one embodiment of the invention as illustrated in FIGS. 4, 5 and 6 the journal bearing for the intermediate cam shaft drive is a bearing insert generally identified as 94. The bearing insert, as best illustrated in FIG. 6, is much smaller than the cylinder head 32 and therefore is much easier to position for manufacture in offline production. Further, because the bearing insert 94 can be manufactured offline there is no need to position drilling means in close proximity to the cylinder head 32. The bearing insert 94 is press fit into the cylinder head 32 by means known in the art.

Another aspect of this embodiment is that the top surface of the insertion window forms a plane that is coplanar with the plane defining the top surface of the cylinder head intake passages 38. The coplanar geometry allows the insertion window to be closed out by intake manifold 40 thereby eliminating the need for a separate insertion window close out cover.

Figure 7:
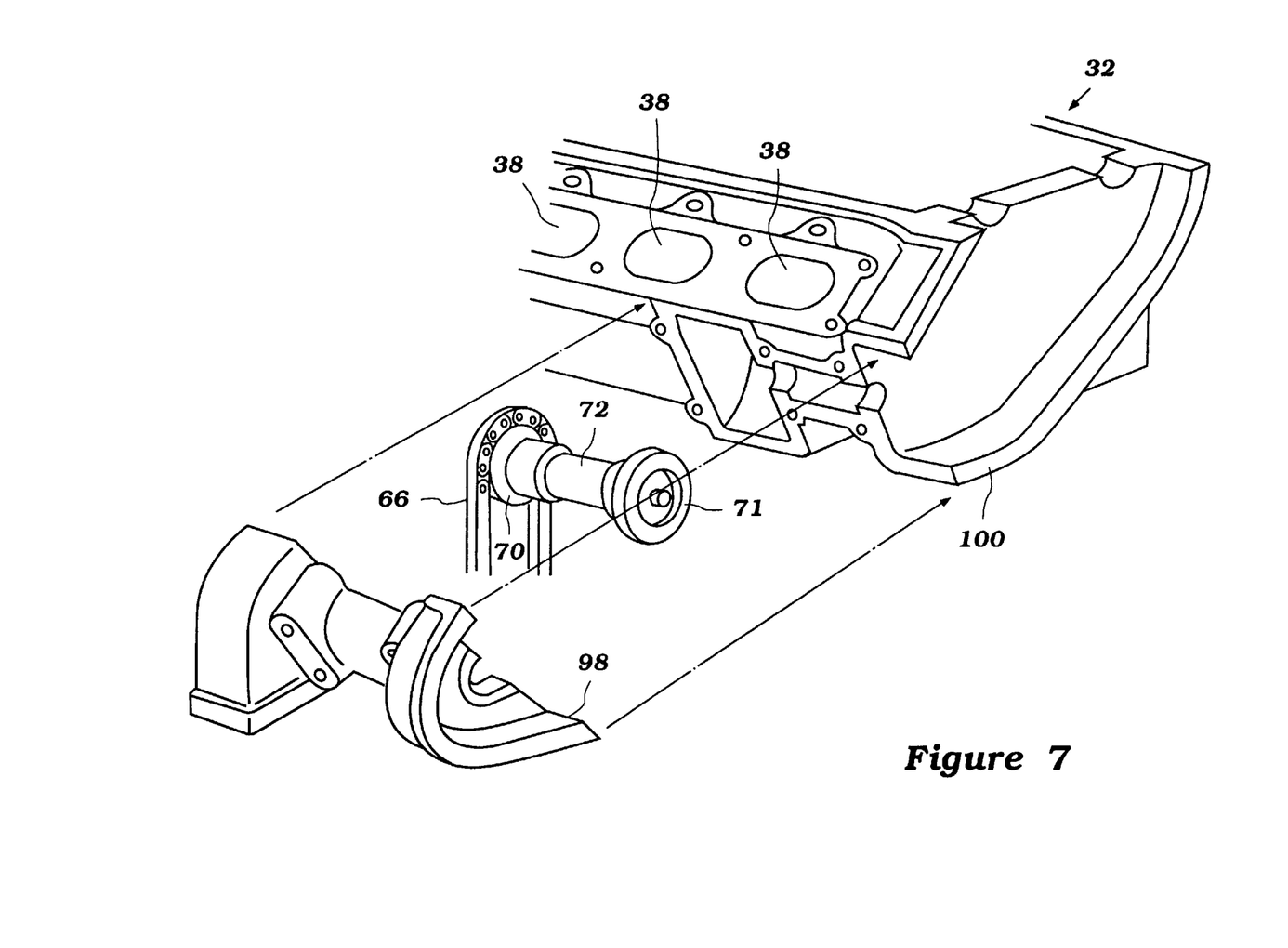
FIG. 7 is an exploded perspective drawing of the cylinder head in accordance with another embodiment of the invention.

Another embodiment of the present invention is shown in FIG. 7. In this embodiment, the bearing for the intermediate cam drive shaft 72 is defined by both the cylinder head 32 and also the detachable housing, or journal, member 98.

When the detachable housing member 98 is fastened to the cylinder head 32 by fasteners as know in the art the intermediate drive shaft 72 is journalled between the cylinder head 32 and the detachable housing member 98. The manufacturing, assembly and serviceability advantages of the design arise from the accessibility of the bearing surfaces. Another advantage is that the detachable housing member 98 also provides a protective cover for the sprocket 70 and the need for a separate cover is thereby eliminated.

The detachable housing member 98 also contains portion of a camshaft drive cover 100. By locating a portion of the camshaft drive cover 100 on the detachable housing member 98 the accessibility to the area around the sprockets 76, 78 and 80 is increased thereby minimizing the difficulty of assembly and maintenance.

Figure 8:
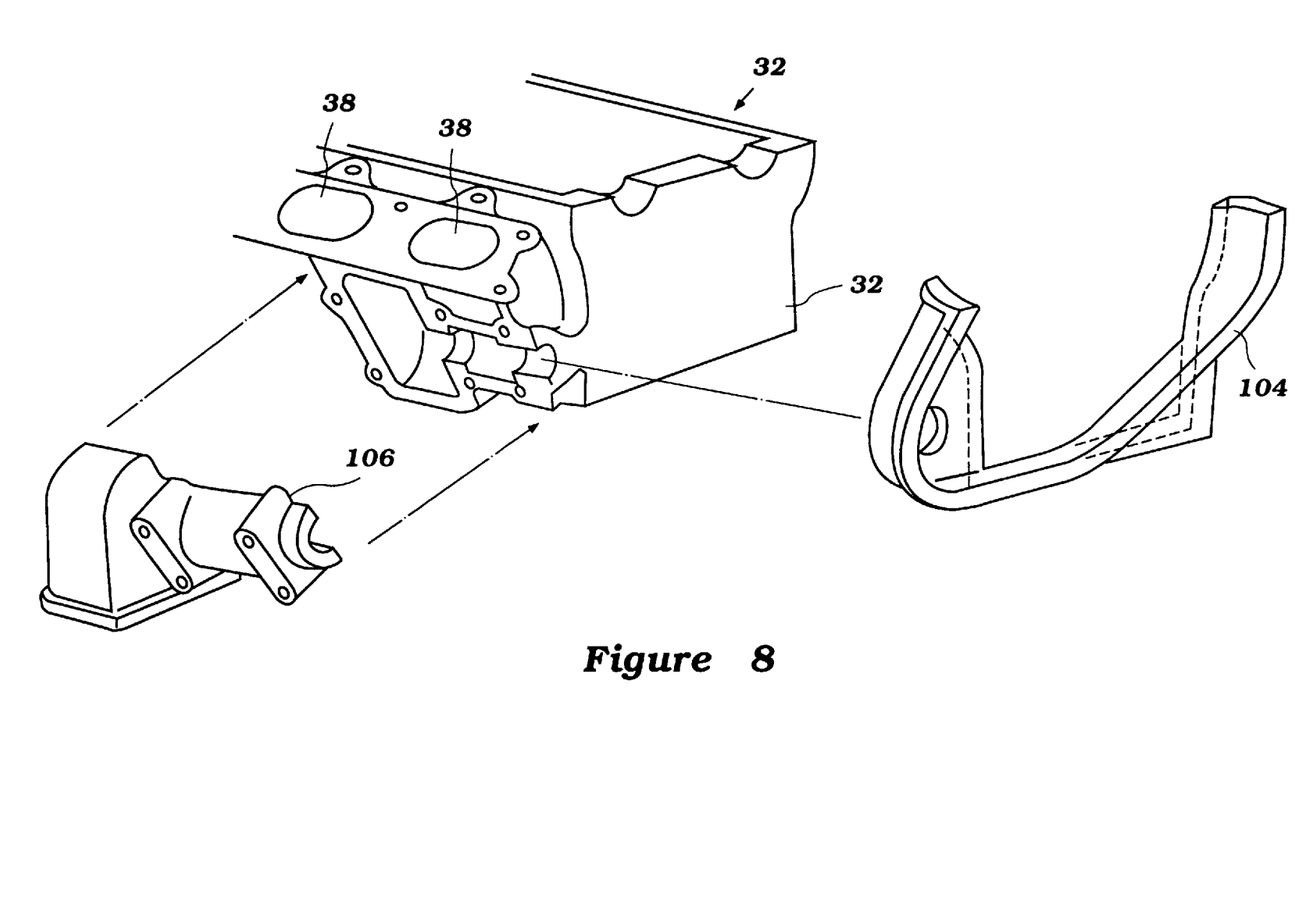
FIG. 8 is an exploded perspective drawing of the cylinder head in accordance with yet another embodiment of the invention.

Another embodiment of the present invention is shown in FIG. 8. In this embodiment, much like the previous embodiment, the intermediate cam drive shaft housing, or journal, is contained both on the cylinder head 32 and also on a detachable housing member 102. When the detachable housing member 102 is fastened to the cylinder head 32, by fasteners as known in the art, the cam drive shaft 72 is journalled between the cylinder head 32 and the detachable housing member 102. The manufacturing, assembly and serviceability advantages of the design arise from the accessibility of the bearing surfaces. Another advantage is that the detachable housing member 102 also provides a protective cover for the sprocket 70 and the need for a separate cover is therefore eliminated. In this embodiment, the camshaft drive cover 104 is completely separate from the detachable member 102. By locating the camshaft drive cover 104 separate from the detachable member 102 the serviceability of the camshaft chain 74 is improved.

Figure 9:
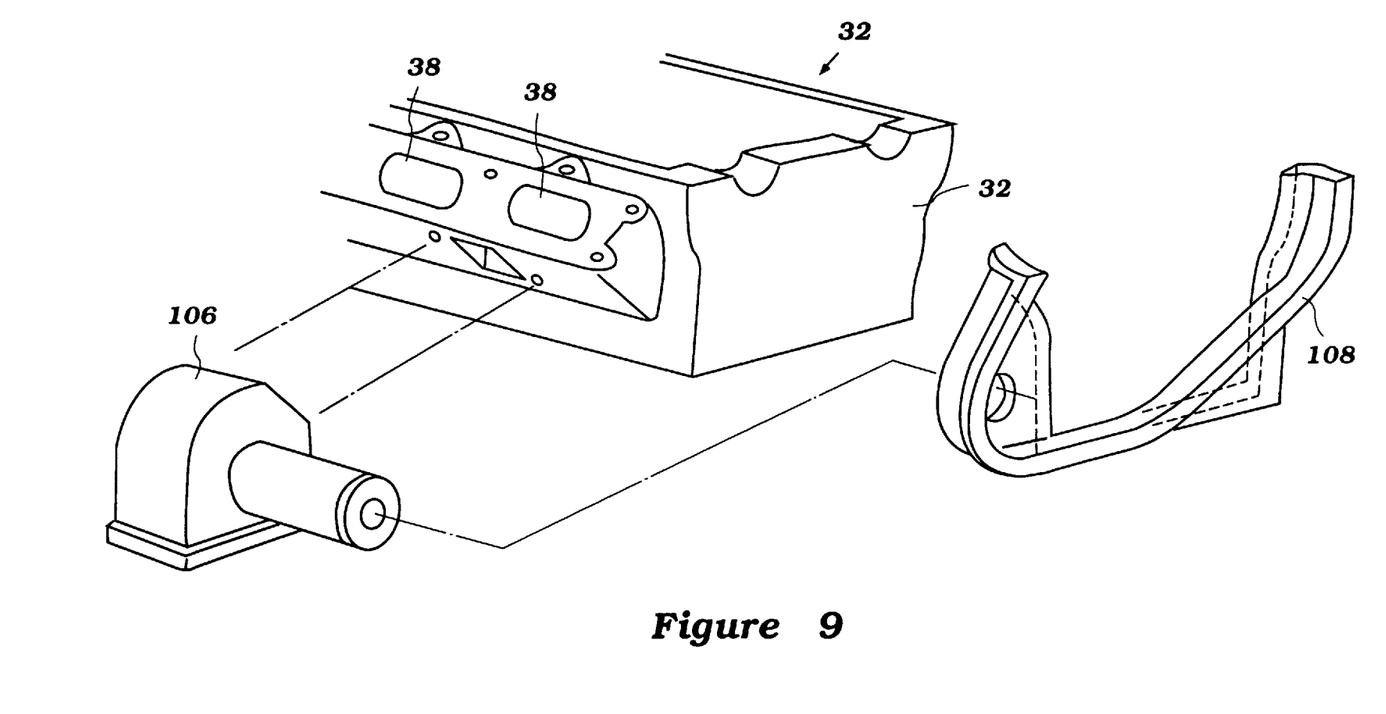
FIG. 9 is an exploded perspective drawing of the cylinder head in accordance with still another embodiment of the invention.

Yet another embodiment of the present invention is shown in FIG. 9. In this embodiment the detachable housing, or journal, member 106 completely journals the intermediate cam drive shaft 72. Further, the detachable member provides a cover for the sprocket 70 and the chain 66. The detachable housing member 106 is fastened to the cylinder head 32 with mechanical fasteners as known in the art. As with the previous embodiment, the camshaft drive cover 108 is completely separate from the detachable member 106. By locating the camshaft drive cover 108 separate from the detachable member 106 the serviceability of the camshaft chain 74 is improved.

Referring back to FIG. 1 and applicable to all embodiments applied above, the camshafts 46 and 54 are normally driven at one half crankshaft speed. Usually this is accomplished by means of a 2:1 gear or sprocket reduction between the crankshaft and the camshafts. Such large reductions in a single drive tend to cause the gears and/or sprockets to be unduly large. In accordance with this invention, the ratio between the sprockets: 60 and 64 on the balance shaft 62; 70 and 71 on the cam drive shaft 72; and 76 and 78 on the camshafts 46 and 54 provide the proper 0.5 speed reduction. Further, referring to FIG. 2 a variable valve timing means 109 is axially connected to camshaft 46 to adjust the valve timing as known in the art.

As is well known, an in-line type of internal combustion engine has certain forces that cannot be fully balanced merely by counterweighting the crankshaft. Therefore, in order to balance all of the forces on the engine, there are provided a balance mechanisms as shown best in FIG. 2. The first balance mechanism 110 is attached to gear 60 as known in the art. In the preferred embodiment of the present invention of the balance mechanism 110 consists of a balancer mass axially fixed on balance shaft 62 with mechanical fastener, such as a snap ring, and it being rotatably coupled to the gear 60 by a torsional spring circumferentially spaced around the gear and the inertial mass. As a result, the torsional springs provides some torsional vibration damping for the engine. A second balance means is provide by the eccentric mass 112 formed on the balance shaft 62.

Figure 2:
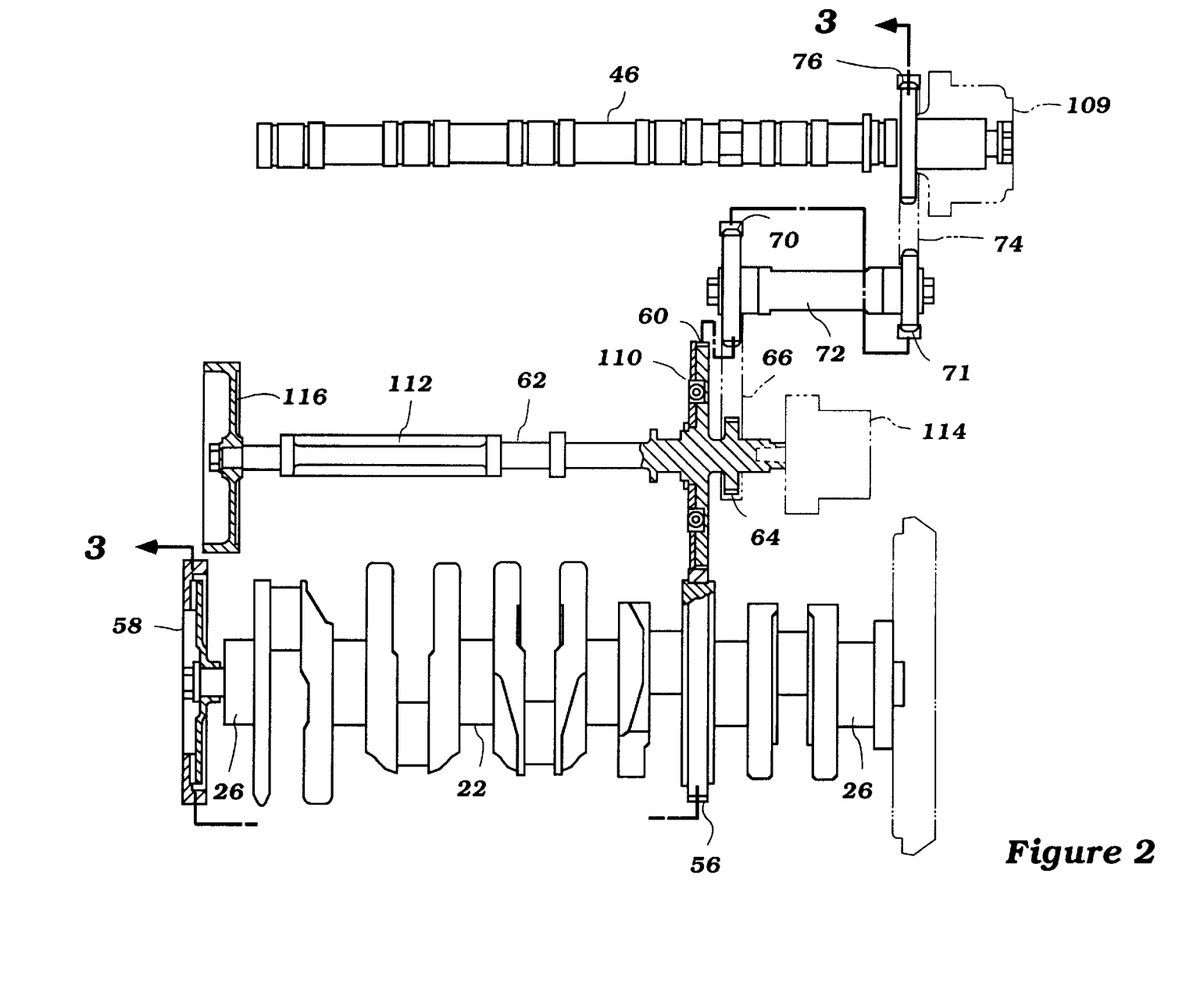
FIG. 2 is a cross-sectional view of the engine taken generally along line 2—2 of FIG. 1.

The balance shaft 62, at an end nearest sprocket 64, contains an internal spline to accept to accept the splined input shaft of the power steering pump 114 as illustrated in FIG. 2. On the opposite end of the balance shaft 62 is mounted an auxiliary drive pulley 116. The pulley 116 drives the belt 118 as illustrated in FIG. 1. The auxiliary drive belt 118 in turn drives the alternator through alternator input pulley 120 and the compressor through compressor input pulley 122. In order to effectively guide the drive belt 118 to the different input pulleys an idler pulley 124 may be incorporated. Further, to provide adequate tension in the drive belt 118 a belt tensioner 126 is incorporated.

It has been previously noted that the crankcase 24 is of the dry sump type. An oil reservoir tank, not shown, is in communication with an oil pump 128. The oil pump 128 draws oil from the bottom of the crankcase 22 and is delivered to the lubrication system of the engine in any suitable manner.

It should be readily apparent from the foregoing description that the described cam drive system provides a unit that is easy to manufacture, assemble and service.

Of course, the foregoing description is that of preferred embodiments of the invention, and various changes and modifications may be made without departing from the spirit and scope of the invention, as defined by the appended claims.

What is claimed is:

1. An overhead camshaft internal combustion engine comprised of a cylinder block defining a plurality of cylinder bores, a cylinder head assembly affixed to said cylinder block and closing one end of said cylinder bores to form a plurality of combustion chambers therein along with pistons reciprocating in said cylinder block, said cylinder head assembly comprising a plurality of poppet type valves each associate with respective of said combustion chambers, a cam shaft journalled in said cylinder head for operating said poppet type valves, a crankshaft rotatably journalled relative to said cylinder block at the end of said cylinder bores opposite said cylinder head and driven by said piston, said cylinder head assembly including at least one detachable member at one side thereof providing at least in part a journal for journalling an intermediate shaft for rotation about an axis parallel to the axes of rotation of said crankshaft and said camshaft, a first flexible transmitter for driving said intermediate shaft from said crankshaft at a point spaced inwardly from one end of said cylinder block and between two of said cylinder bores, and a second flexible transmitter for driving said camshaft from said intermediate shaft.

2. An overhead camshaft internal combustion engine of claim 1 wherein, said detachable member comprises a bearing insert to rotatably journal said intermediate shaft independent of said cylinder head and said cylinder head including an area to receive said bearing insert.

3. An overhead camshaft internal combustion engine of claim 2 wherein, said cylinder head assembly further comprises an air intake on a side of said cylinder head opposite said cylinder block and defined by a plane, said plane being coplanar with a second plane defined by a surface on said area of said cylinder head for receiving said bearing insert.

4. An overhead camshaft internal combustion engine of claim 3 wherein, said cylinder head further comprises an integrally attached camshaft drive cover on a side of said cylinder head perpendicular to said axes of said crankshaft and said camshaft.

5. An overhead camshaft internal combustion engine of claim 3 wherein, said cylinder head further comprises a detachable cam shaft drive cover on a side of said cylinder head perpendicular to said axes of said crankshaft and said camshaft.

6. An overhead camshaft internal combustion engine of claim 1 wherein, said cylinder head defines at least a part of said journal, the detachable member defining the remaining portion of said journal.

7. An overhead camshaft internal combustion engine of claim 6 wherein, said cylinder head further comprises an integrally attached camshaft drive cover on a side of said cylinder head perpendicular to said axes of said crankshaft and said camshaft.

8. An overhead camshaft internal combustion engine of claim 6 wherein, said cylinder head further comprises a detachable cam shaft drive cover on a side of said cylinder head perpendicular to said axes of said crankshaft and said camshaft.

9. An overhead camshaft internal combustion engine of claim 1 wherein, said detachable member completely journals said intermediate shaft.

10. An overhead camshaft internal combustion engine of claim 9 wherein, said cylinder head further comprises an integrally attached camshaft drive on a side of said cylinder head perpendicular to said axes of said crankshaft and said camshaft.

11. An overhead camshaft internal combustion engine of claim 9 wherein, said cylinder head further comprises a detachable cam shaft drive cover on a side of said cylinder head perpendicular to said axes of said crankshaft and said camshaft.

* * * * *